United States Patent
Cressman et al

[15] 3,672,210
[45] June 27, 1972

[54] ULTRASONIC INSPECTION SYSTEM WITH SCANNED MULTIPLE TRANSDUCERS

[72] Inventors: Russell N. Cressman, Center Valley; Walter J. Bantz; Edward M. Nusbickel, Jr., both of Allentown, all of Pa.

[73] Assignee: Bethlehem Steel Corporation

[22] Filed: Nov. 20, 1969

[21] Appl. No.: 878,488

[52] U.S. Cl. .................................................. 73/67.9
[51] Int. Cl. ................................................. G01n 29/04
[58] Field of Search ........................... 73/67.9, 67.8, 67.8 S

[56] References Cited

UNITED STATES PATENTS

| | | | |
|---|---|---|---|
| 3,011,338 | 12/1961 | Furon | 73/67.9 |
| 3,285,059 | 11/1966 | Bogle | 73/67.9 |
| 3,373,602 | 3/1968 | Wendt et al | 73/67.8 X |
| 3,555,889 | 1/1971 | Weighart | 73/67.9 |

OTHER PUBLICATIONS

Ultrasonic Automation, The Autosonic System Instrument Practise, April 1957, p 353– 356

Primary Examiner—Richard C. Queisser
Assistant Examiner—John P. Beauchamp
Attorney—Joseph J. O'Keefe

[57] ABSTRACT

Portable ultrasonic search unit has multiple transducers, each located over an incremental surface of a metallic workpiece. Each transducer is connected to a combined pulser/prereceiver operating under control of a single gate. A binary counter, driven by a triggering pulse from a clock, issues binary coded channel selecting signals. Each control gate also functions as a decoder of these signals and enables itself unassisted by other circuitry and in sequence with the other gates, thus causing electronic scanning of the transducers. A series of pulse echo signals from each prereceiver are passed in sequence through a main receiver amplifier and on to a system of gates. These gates are synchronized by the triggering pulse and pass only preselected pulse echo signals from each prereceiver. Defect signal discriminators sample the gated pulse echo signals and simultaneously distinguish between transposition and amplitude ratio determined defects, such as laminations, and other defects. Alarms for each channel, or other utilization circuits, are selectively activated by the discriminator outputs when combined with channel selecting signals.

6 Claims, 3 Drawing Figures

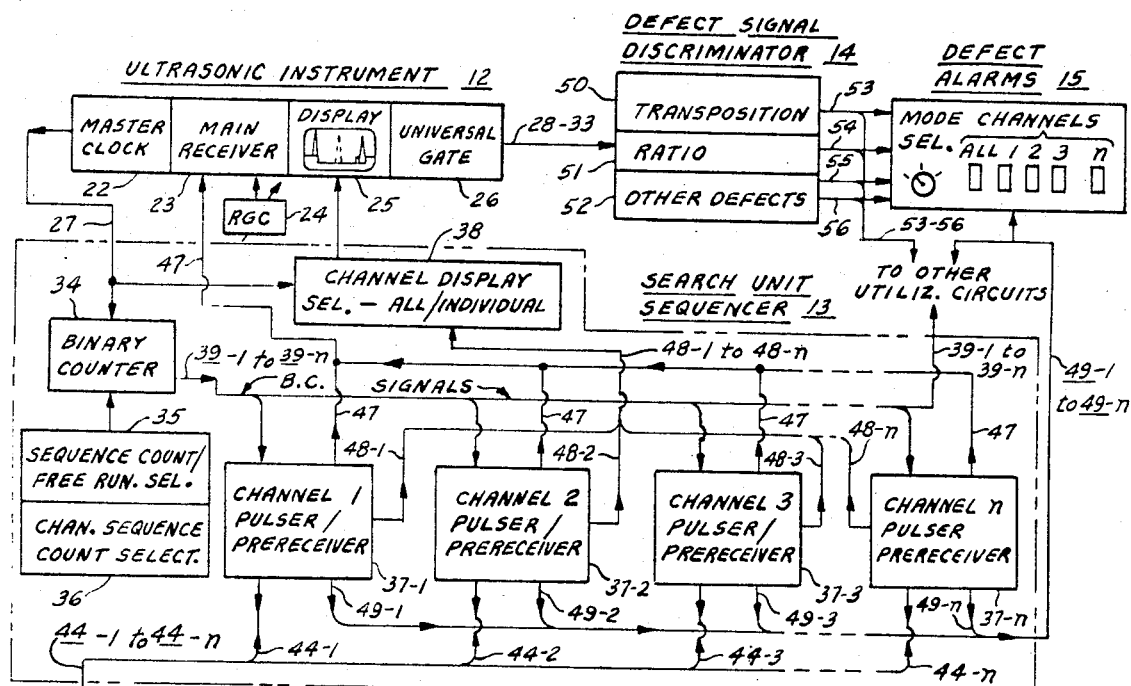
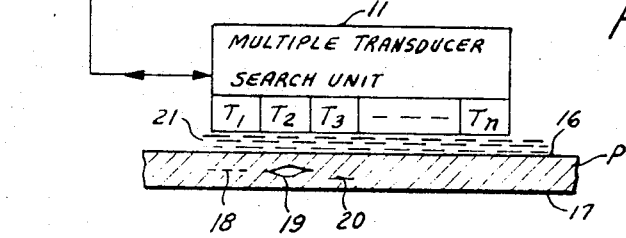
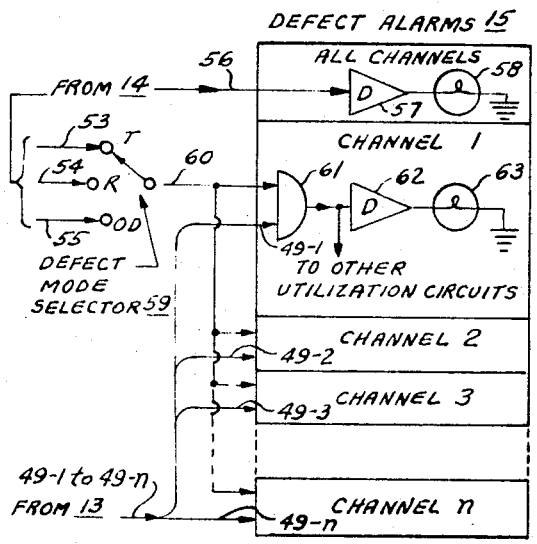
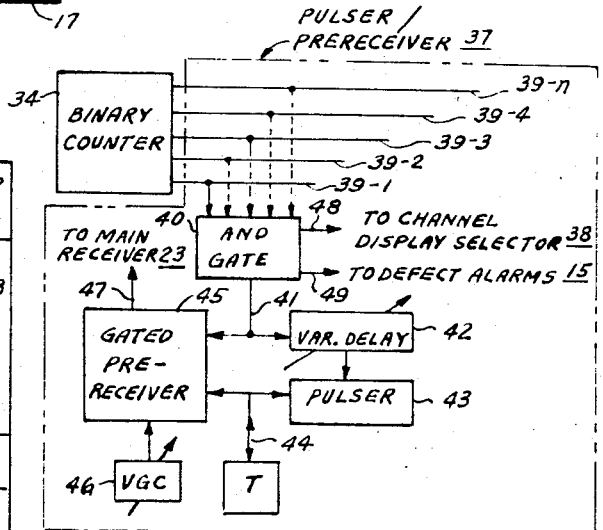
FIG. 1
FIG. 2
FIG. 3
INVENTORS
Russell N. Cressman
Walter J. Bantz
Edward M. Nusbickel, Jr.

ULTRASONIC INSPECTION SYSTEM WITH SCANNED MULTIPLE TRANSDUCERS

BACKGROUND OF THE INVENTION

This invention relates to ultrasonic nondestructive testing apparatus. More particularly it relates to an ultrasonic inspection system having electronically scanned multiple transducers for detecting different predetermined acoustical properties of incremental portions of a test piece.

In current production of steel plates for example, where plates are produced at speeds as fast as about 2 minute intervals in sizes ranging up to 12 ft. wide, 40 ft. long and longer, and up to 6 in. thick, it has become necessary to obtain assurance that such plates are of a uniform high quality because of increasingly critical applications thereof. Ultrasonic nondestructive testing has emerged as the preferred method of assuring plate quality.

Heretofore, hand inspection of plates using a single transducer ultrasonic instrument was the most widespread method available, but this proved too slow and expensive for 100 percent production inspection of contemporary plates, particularly at their large sizes and production speeds. Limited attempts at utilizing multiple transducer inspection systems have not proved entirely satisfactory for several reasons. One reason is that they generally require a huge liquid-filled tank in which the large plates must be submerged for acoustical coupling purposes, and a tank-supported bridge for carrying a lateral array of submerged transducers which is moved longitudinally of the plate. Another reason is the requirement for extra plate handling time and equipment. Still another reason is that complex electronic equipment is required for electronically pulsing, switching and receiving of transducer signals which requires switching delays, or staggered pulsing of transducers, or both, which inherently places limitation on system performance. Beyond that some such systems require rather complex analysis equipment for determining defect or other physical properties of the test pieces.

SUMMARY OF THE INVENTION

One of the objects of this invention is to provide improved ultrasonic apparatus for nondestructive testing of a test piece.

A further object of this invention is to provide ultrasonic inspection apparatus which does not require submersion of contemporary size steel plates, for example, in a fluid tank, yet allows for economical 100 percent production inspection of such plates.

Another object of this invention is to provide ultrasonic inspection systems having multiple transducers with less complex and dependent electronic component restrictions as regards to gating and transducer selection circuitry and switching sequence order.

Still another object of this invention is to provide such an ultrasonic inspection system with simplified pulse echo signal evaluation circuitry.

Other and further objects of this invention will become apparent during the course of the following description and by reference to the accompanying drawings and appended claims.

The foregoing objects can be attained with an ultrasonic inspection system having a portable search unit and fluid couplant source which permits 100 percent off-line inspection of contemporary size steel plates, for example, while temporarily stored flat in a production inspection position. The search unit includes a plurality of ultrasonic transducers connected to a sequencer having a combined pulser/prereceiver operating under control of a single gate for each transducer channel. A binary counter, driven by triggering pulses from a clock, issues binary coded channel selecting signals. Each control gate also functions as a decoder of these binary signals and enables itself unassisted by other circuitry, and in sequence with the other gates, thus causing electronic scanning of the transducers. A series of pulse echo signals from each prereceiver are passed in sequence through a main receiver amplifier and on to a system of gates. These gates are synchronized by the timing pulse and pass only preselected pulse echo signals from each prereceiver. Defect signal discriminators sample the gated pulse echo signals and simultaneously distinguish between transposition and amplitude ratio determined defects, such as laminations, and other defects. Alarms for each channel, or other utilization circuits are selectively activated by the discriminator outputs when combined with channel selecting signals.

Regarding the term "transposition," industry accepted procedures require a rise in the lamination defect echo signal accompanied by a loss of the rear surface echo signal. Thereafter, the latter signal may be replaced by a multiple defect signal. This change in relative amplitudes of the defect echo and rear surface echo signals in the aforesaid sequence, and the possible substitution of a multiple of the defect signal for the rear surface signal, is sometimes referred to, as it will be herein, as the transposition method of detecting lamination defects. However, use of this method may be applied to determining other parameters as well.

DESCRIPTION OF THE DRAWING

FIG. 1 is a schematic diagram of one embodiment of the present invention.

FIGS. 2 and 3 are diagrams of respective pulser/prereceivers and defect alarm system utilized in the FIG. 1 embodiment.

DESCRIPTION OF THE PREFERRED EMBODIMENT

Referring to the drawings, particularly FIG. 1, there is generally shown ultrasonic inspection system 10 operatively associated with a test piece which, for illustrative purposes, may be a flat steel plate P. Ultrasonic inspection system 10 comprises portable search 11 having multiple transducers $T_1 - T_n$, ultrasonic instrument 12, search unit sequencer 13, defect signal discriminator 14 and defect alarm 15. The test piece, plate P, is shown having front and rear surfaces 16, 17 an acceptable or harmless defect 18 under transducer $T_1$, a lamination or void defect 19, under transducer $T_2$, and another defect 20, such as an inclusion, under transducer $T_3$.

Portable search unit 11 is adapted for relative movement with plate P and includes a plurality of ultrasonic transducers $T_1-T_n$ which are mounted normal to plate surface 16. The transducers are adapted, if desired, to follow undulations in plate P and further adapted to transmit and receive ultrasonic pulsed energy respectively to and from plate P. A liquid couplant 21, supplied from a source not shown, may be used in the acoustical pathway between transducers $T_1-T_n$ and plate P. For convenience, a suitable portable search unit 11 found satisfactory for inspecting steel plates, for example, is a multiple transducer embodiment of that disclosed and claimed in a copending or the copending application by Edward M. Nusbickel, Jr., Ser. No. 878,481 filed Nov. 20, 1969, now U.S. Pat. No. 3,616,684, entitled "Ultrasonic Inspection Carriage" and assigned to the assignee herein.

Ultrasonic instrument 12, a conventional device, consists essentially of master clock 22, main receiver 23, gain control 24, a cathode ray tube (CRT) type of signal display 25, and a universal gate section 26, all as briefly described below. A commercially available ultrasonic instrument exemplifying instrument 12 is one manufactured by Branson Instrument Co., Stamford, Conn., their model series 600. For convenience, a detailed description of its major components will be found in a copending application by Edward M. Nusbickel, Jr., Ser. No. 878,482 filed Nov. 20, 1969 entitled "Ultrasonic Defect Signal Discriminator" and assigned to the assignee herein.

Briefly, master clock 22, produces a triggering pulse whose pulse rate is adjustable between about 0.5 to about 12.0 KHz. Clock 22 output is fed directly to sequencer 13 on circuit 27 and to universal gate 26 described below, and through a slight time delay (not shown), to display 25 for synchronizing the CRT sweep circuits.

Main receiver 23 continuously receives and amplifies in sequence a series of front, rear and defect pulses echo signals from each prereceiver in sequencer 13, all as described below. Main receiver 23 includes a manually-operated variable gain control 24 for varying the amplification of echo signals and, therefore, the overall calibration of ultrasonic instrument 12.

Display 25 is fed amplitude variable pulse echo signals from main receiver 23 and images these as waveforms on the screen of its CRT. In addition, display 25 images a composite waveform of a defect gate and a rear surface gate based on signals received internally from universal gate 26.

Universal gate 26 includes a gating system which, together with well known threshold detectors and sample and hold circuits receives the sequential series of front, rear and defect pulse echo signals from main receiver 23 and the triggering pulses from clock 22. These devices act in synchronism with the triggering pulses during the interval between successive triggering pulses to produce a plurality of gate 26 output signals at circuits 28–33 for sampling control and automatic signal discrimination purposes at circuits 28–33. More specifically, universal gate 26 passes the clock triggering pulse to output circuit 28 and produces a rear surface interval gating pulse on circuit 29, the latter following a defect pulse echo gating pulse used internally. In addition, universal gate 26 produces defect echo threshold and rear surface echo threshold output signals on circuits 30, 31 when their respective pulse echo amplitudes exceed individual predetermined thresholds. Universal gate 26 also produces defect pulse echo, and rear surface pulse echo, pen recording outputs on circuits 32, 33, respectively. Signal amplitude on circuits 32, 33 varies in response to the output of the sample and hold circuits noted above, said signals being held at the amplitude prevailing at the end of the defect pulse echo gating pulse and the rear surface interval gating pulse, respectively, occurring in the latter portion of each triggering pulse cycle.

Still referring to FIG. 1, search unit sequencer 13 is comprised of binary counter 34 and selectors 35, 36, a plurality of pulser/prereceivers 37–1 to 37–n for sequencer 13 channel 1 to n, which are connected to transducers $T_1$ to $T_n$, and channel display selector 38.

Binary counter 34, a conventional device having flip-flop output circuits, is triggered by the clock 22 triggering pulse fed over circuit 27. Counter 34 produces conventional binary coded channel selecting signals on its output circuits 39–1 to 39–n which are fed to the plurality of channel pulser/prereceivers 37–1 to 37–n. If, for example, there were eighteen channels to be selected, then a five-channel output bus from counter 34 would be needed to provide sufficient channel selecting code combinations. The bus would include both "1" and "0" outputs from channel flip-flops, thus permitting code combinations to be derived from 10 circuits. Because a binary counter is used instead of a shift register, for example, the need for reliance upon preceding circuitry for pulses to advance channel selection is now obviated. This avoids stoppages in electronic switching which would occur if any element in a shift register element failed to operate.

Selector 35, a conventional multi-position selector switch, is wired to and controls the basic operation of binary counter 34, that is, in one position it permits the counter to run free without resetting, while in another position it causes counter 34 to reset at a predetermined count. Selector 36 also a conventional multi-position selector switch is a channel sequence count selector which is wired to selector 35 and establishes the predetermined count at which counter 34 is reset. In other words, if it is desired to stop the electronic scanning sequence at any channel from 1 up to n, selector 36 would be so positioned to cause counter 34 to reset at that channel and start counting over again at the next triggering pulse.

Turning now to FIG. 2 there is shown a typical combined pulser/prereceiver 37 controlled by a single AND gate 40 for use in each of the channels 1 to n of sequencer 13. A predetermined number of the binary coded channel selecting signals on output circuits 39–1 to 39–n are fed to the input of each AND gate 40. Based on the example noted above, each AND gate 40 would be adapted with a standard five-input circuit arrangement and would be fed from a different group of five of the ten "1" and "0" circuits in counter 34 five-channel output bus. In FIG. 2, this is illustrated by both solid and dotted lines tapped from lines 39–1 to 39–n. The particular input connection arrangement for each different AND gate 40 is derived from standard decimal decoding of the binary signals according to a predetermined decimal equivalent assigned to each given channel, up to the capacity of code combinations. Each AND gate 40 is enabled by the presence of five discrete input signals for the interval between successive triggering pulses of clock 22 by the proper channel selecting code, thereby effecting sequential electronic switching to occur from channel 1 to n when selected. AND gate 40 output is fed over lead 41 to variable delay 42 and then to activate pulser 43. Variable delay 42 is provided mainly as an adjustment for slight variations in pulser 43 electrical characteristics from channel to channel. This enables precise time phase adjustments of pulse echoes so that each channel coincides with the others for display, gating and signal evaluating purposes.

Pulser 43 may consist of a silicon controlled rectifier (not shown) in series with a load resistor (not shown) and switched on momentarily by AND gate 40 output signal. The pulser output signal is fed over circuit 44 to a transducer T, thereby causing pulsed ultrasonic energy to be transmitted into plate P (shown in FIG. 1).

Ultrasonic pulse echoes are picked up by transducer T and converted to corresponding electrical pulse echo signals. These are conducted over circuit 44 to prereceiver 45 which includes a limiter (not shown) circuit to limit pulser current in the receiver input to a suitably low level. Prereceiver 45 functions as a gated preamplifier which is switched on by AND gate 40 output received over circuit 41 (the channel selection signal). To accommodate variations in preamplifier and cable impedance characteristics and variations in transducer characteristics, variable gain control 46 is provided for equalizing the various prereceiver 45 outputs at circuit 47. Prereceiver 45 is also provided with an isolated output circuit (not shown) so that their respective outputs may be directly coupled over circuit 47 to the main receiver 23 input.

AND gate 40 also provides decoded channel selection signals over circuit 48–1 to n to channel display selector 38 and over circuit 49–1 to 49–n to defect alarms 15.

Referring back to FIG. 1, channel display selector 38, a conventional multi-position selector switch in one position feeds the clock 22 triggering pulse from circuit 27 to the sweep start circuit of display 25. Under this condition, the sequential output of all prereceivers 45 is fed to the CRT where, because of image persistence, all series of pulse echo signals will appear to be superimposed upon each other. In other positions of selector 38, each of the gate 40 decoded channel selecting signals fed over circuits 48–1 to 48–n are selectively applied to the aforesaid sweep start circuit, one at a time. Thus, any one transducer channel output may be viewed isolated from all others. Selector 38 in these positions also provides a visual means for evaluating adjustment of variable delay 42 for each pulser/prereceiver 37. For these reasons, it will be appreciated that selector 38 is provided as a convenience for verifying gate and pulse echo signals time frame of reference as opposed to being an essential part of the testing circuit.

Still referring to FIG. 1, defect signal discriminator 14 receives the universal gate 26 outputs over circuits 28–33, and by employing logic elements combined with an internal "strobe" gate, electronically monitor two pulse echo signals at the pulse trailing edge of a predetermined gating interval to distinguish between different types of physical properties of the test piece. The triggering pulse on circuit 28 and the rear surface interval gating pulse on circuit 29 are fed to inputs of the "strobe gate." These pulses function as sampling control signals during monitoring of the defect and rear surface signals. As exemplified herein, laminations 19 and other types of defects 20 are distinguished by monitoring the defect pulse echo and rear surface pulse echo signals in transposition, ratio and other defect signal discriminators 50, 51, 52, respectively. For convenience, suitable discriminators found satisfactory for this purpose are disclosed in detail in the aforementioned copending patent application, of Edward M. Nusbickel, Jr. Ser. No. 878,482 filed Nov. 20, 1969. A brief description of discriminator operation follows.

In operation, transposition discriminator 50 is reset at the beginning of each triggering pulse, circuit 28, regardless of which transducer channel has been selected for operation. It monitors the changes in amplitude and sequence of occurrence of defect echo threshold and rear surface echo threshold signals, circuits 30, 31, during a "strobe" gate interval which starts at the pulse trailing edge of the rear surface gating interval, circuit 29, and ends with the onset of clock 22 triggering pulse. The "strobe" gate is caused to occur as late in each triggering pulse cycle as is practical for comparison purposes. This has two advantages, viz., it minimizes electronic switching and other noise effects because of signal stability in that part of the pulse cycle, and, in addition, increases reliability of successive echo signal evaluations.

When search unit 11 is moved over plate P and one of the transducers, such as $T_1$, encounters either an acceptable portion of plate P, or a harmless defect 18, no transposition or other output signal will occur. When a transducer, such as $T_2$, is caused to approach lamination 19, the defect echo signal starts to rise and the rear surface echo signal starts to fall, but there is no transposition output signal as yet. However, when transducer $T_2$ is over lamination 19, a transposition output signal will occur on circuit 53 when (a) the defect echo signal has risen above its threshold, (b) there is at least a momentary fall in the rear surface echo signal below its threshold, or not present at all, and (c) there is a "strobe" gate signal present.

Regarding ratio discriminator 51, the amplitude variable defect echo and rear surface echo pen recorder signals, circuits 32, 33, are fed through respective fixed and variable voltage dividers to the inputs of a comparator having a digital output. Electronic discrimination between laminations and other defects is also made, but in a manner different than transposition discriminator 50. The defect echo signal acts as a reference signal against which the rear surface echo signal is compared to determine their amplitude ratio. The adjustable voltage divider setting determines the particular ratio about which the comparator operates. This setting is made in accordance with the acoustical properties of plate P and those of the defects to be detected.

When search unit 11 is over an acceptable portion of plate P, the rear surface echo signal is high and a defect echo signal is absent, thus causing comparator output to be absent. When search unit 11 moves toward, or over a lamination, the defect echo signal goes high and the rear surface signal goes low. Thus, whenever the defect echo signal is equal to or greater than the rear surface echo signal, the comparator output will be present. In other words, the rear surface echo signal will be less than the defect echo signal which is indicative of a lamination because of the change in acoustical properties of, and pathways within, plate P in the region of lamination 18. Whenever the comparator output and the "strobe" gate outputs are present, then a ratio output signal will be present on circuit 54.

With respect to other defects discriminator 52, this device electronically excludes lamination defects and responds only to other kinds of defects 20, such as inclusions, etc. The defect echo threshold signal received on circuit 30, together with the presence of the "strobe" gate signal and the absence of both the transposition and ratio output signals on circuits 53, 54, cause the other defect output signal to be present on circuit 55. The absence of such signal indicates either the absence of defect 20 or the presence of lamination defect 19.

Generally, every pulse echo defect signal that occurs during defect gating which exceeds its predetermined threshold level causes an "all" defect output signal to occur on circuit 56 without "strobe" gate or other pulse requirements.

The above description of pulse echo signal discrimination of various types of defects applies not only to each series of pulse echo signals fed from a given prereceiver 45, but to every prereceiver output in the scanned sequence of transducers.

The transposition, ratio, and other defect output signals fed from defect signal discriminators 14 over circuits 53, 54, 55, together with channel selecting signals 49-1 to 49-n may be used in a variety of ways. For example, these signals may be used to drive defect markers or digital recorders or data processing system involved in the analysis of incremental portions of plate P. For illustrative purposes, these defect and selecting signals are fed to defect alarms 15 where a defect mode selector switch and a single "all" channel and individual channel alarms are provided. Each of these alarms may be a light, buzzer, etc. powered by a driver.

Referring now to FIG. 3, there is shown defect alarms 15 which includes an "all" channel alarm receiving defect echo threshold signal from circuit 56 and feeds driver 57 which enables light 58 whenever a defect occurs, regardless of what channel of operation is involved. The transposition, ratio, and other defect output signals on circuits 53, 54, 55 are fed to mode selector switch 59. Here, a selection is made of one of the defect signal sources and is applied over circuit 60 to one of the inputs of two-input AND gate 61. The other input to gate 61 is derived from channel selecting signal 49-1. Gate 61 is enabled only when a defect is detected on channel 1, thus corresponding to a defect in the incremental portion of plate P under transducer $T_1$. Gate 61 output is fed to driver 62 which enables light 63 accordingly.

Defects in the other incremental portions of plate P are detected during a scanning sequence in a similar manner and cause their respective alarms on channels 2 to n to be enabled the same as is channel 1. None of the defect alarms are enabled when search unit 11 is located over an acceptable increment, or the entire portion, of plate P.

Additional scope and flexibility of the present invention may be had by adjusting the variable voltage divider in ratio defect discriminator 51 to a setting related to an acoustical property of plate P other than that of a lamination defect. In this manner, transposition defect discriminator 50 may be used to process lamination type of pulse echo defect signals, and the ratio defect discriminator 51 may be used to process pulse echo signals related to the other acoustical property of plate P. Thus, the two discriminators 50, 51 may be used to monitor two different properties of plate P, rather than two different methods of monitoring the same property.

An important feature of the present invention is that ultrasonic instrument 12 gain linearity may be checked rapidly and without additional instrumentation. This is carried out by placing a test piece having a known or standard lamination defect under search unit 11 at, for example, transducer $T_1$, and after positioning selector 59 to the ratio mode, observing that ratio defect alarm on channel 1 is enabled. This alarm should remain enabled when receiver gain control 24 is adjusted throughout its entire range. This is because the comparator in ratio defect discriminator 51 operates on a predetermined ratio, rather than an amplitude principle, and the predetermined ratio should remain constant regardless of gain control 24 setting. If channel 1 alarm does not remain enabled when gain control 24 is adjusted, then a non-linear or an out of calibration condition exists. This condition may be overcome with a slight change in the adjustable voltage divider setting in ratio discriminator 51 which may be sufficient to maintain instrument 12 within calibration tolerances. If the adjustment to this voltage divider does not keep channel 1 alarm enabled, then gain linearity is out of tolerance and ultrasonic instrument 12 should be re-calibrated.

Another advantage of ratio defect discrimination is the fact that considerable variation in acoustical coupling may occur between search unit 11 and plate P because such variations affect the amplitude of the pulse echo signals rather than their ratio. Hence, ratio defect discriminator 51 would not allow a lamination in plate P to go undetected as would an amplitude-sensitive instrument.

We claim:
1. Ultrasonic inspection system for testing a test piece along incremental paths and capable of determining one or more types of physical properties of the testpiece along each incremental path, comprising:
   a. search unit means including a plurality of transducers each of which is acoustically coupled to the test piece at a different incremental path,
   b. a clock for producing a single source of sequential triggering pulses,
   c. a counter connected to the clock for producing a sequence of channel selecting signals at a plurality of outputs in response to only said triggering pulse, said selecting signals having correspondence with said incremental paths,
   d. a plurality of gated pulser/prereceiver combinations, each coupled to said counter and directly connected to a different trans-ducer for sequentially scanning selectively either adjacent or non-adjacent incremental paths of said testpiece, each said combination comprising:
      1. a separate pulser for energizing each different transducer,
      2. a separate prereceiver for preamplifying the electrical signals generated by said transducer and adapted to effectively isolate said transducer output from subsequent circuitry when deenergized,
      3. a first control gate adapted to pass a distinctive channel selecting signal to activate both said pulser and prereceiver in addition to at least one other device by momentarily switching all said devices on from a normally off condition,
   e. a main receiver directly connected to each said prereceiver for receiving a sequence of said preamplified electrical signals therefrom and issuing amplified electrical signals including a defect pulse echo signal occurrable between front and rear surface pulse echo signals associated with each said incremental path,
   f. sampling gating means coupled to said receiver and said clock for producing at least one sequence of gated defect and rear surface pulse echo signals after said triggering pulse and during corresponding defect and rear surface gating intervals of sufficient duration to evaluate any one incremental path, said gating means also issuing said triggering pulse and a rear surface gating interval pulse,
   g. pulse echo signal amplitude discriminating means coupled to said sampling gating means for producing one or more echo initiated output signals synchronized with the rear surface gating interval pulse and terminated by said triggering pulse, said signal discriminating means including a detecting circuit for each said one or more discriminating means outputs for detecting signal amplitude changes such as amplitude transposition, amplitude transposition sequence, and amplitude ratio of each said defect pulse echo signal relative said rear surface pulse echo signal, said discriminating means output signals corresponding to one or more predetermined physical properties of said test piece, and
   h. means for utilizing one or more of the discriminating means output signals to determine one or more physical properties of said test piece, said means including a plurality of second control gates activated sequentially by said channel selecting signals to identify one or more types of physical properties with each incremental path of said test piece.

2. The apparatus of claim 1 wherein said counter is a binary counter producing binary coded channel selecting signals at said plurality of outputs, and wherein each of said plurality of first control gates is further adapted to decode a different one of said binary coded channel selecting signals and pass said decoded selecting signal to said devices.

3. The apparatus of claim 2 wherein said counter further includes:
   1. counter control means for selecting counter automatic reset after a predetermined number of channel counts.

4. The apparatus of claim 2 wherein said counter further includes:
   2. counter control means for selecting one or more predetermined channel selecting signal sequences.

5. The apparatus of claim 1 wherein each of said pulser/prereceiver combination includes a variable delay device preceding said pulser for equalizing variations in pulse echo signal timing on all channels of operation which are caused by variations in pulser, transducer, and/or cable characteristics from one channel to another.

6. The apparatus of claim 1 wherein each of said pulser/prereceiver combination includes a variable gain control associated with said prereceiver for equalizing variations in pulse echo signal amplitude on all channels of operation which are caused by variations in transducer, prereceiver, and/or cable characteristics from one channel to another.

* * * * *

UNITED STATES PATENT OFFICE
CERTIFICATE OF CORRECTION

Patent No. 3,672,210             Dated June 27, 1972

Inventor(s) Russell N. Cressman, et. al.

It is certified that error appears in the above-identified patent and that said Letters Patent are hereby corrected as shown below:

Column 2, line 40, "T.," should read -- $T_1$ -- . Column 4, line 33, after "on", insert -- from a normally off condition -- ; line 43, "48-1 1 to n" should read -- 48-1 to 48-n -- .

Signed and sealed this 2nd day of January 1973.

(SEAL)
Attest:

EDWARD M. FLETCHER, JR.            ROBERT GOTTSCHALK
Attesting Officer                  Commissioner of Patents